2,849,429

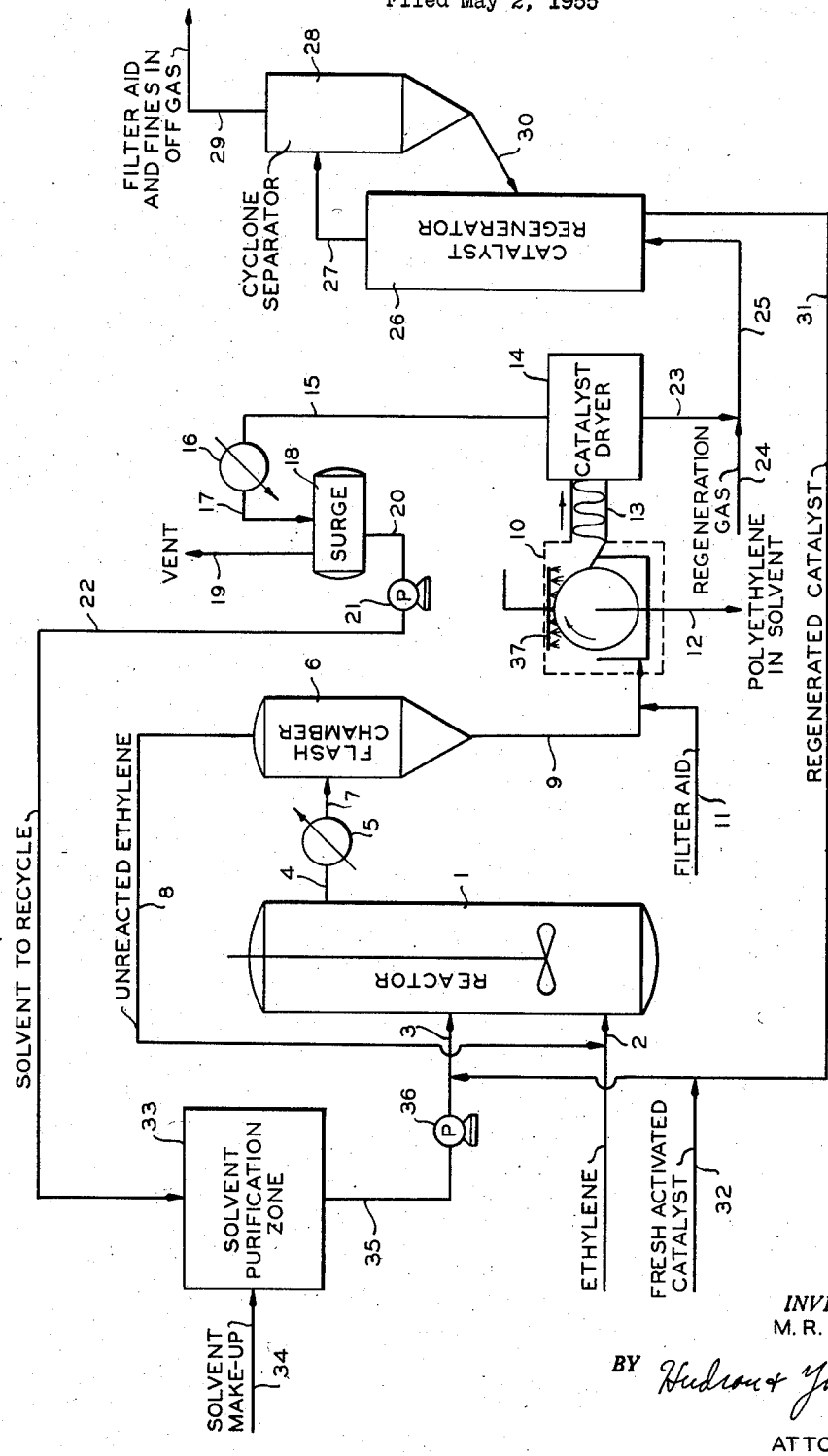

FILTRATION AND CATALYST REGENERATION IN OLEFIN POLYMERIZATION

Martin R. Cines, Bartlesville, Okla., assignor to Phillips Petroleum Company, a corporation of Delaware Application May 2, 1955, Serial No. 505,174

10 Claims. (Cl. 260—88.1)

This invention relates to catalyst separation and regeneration in the process of polymerizing olefins to form solid polymers. In one of its aspects, this invention relates to separation of filter aid and regeneration of catalyst in an olefin polymerization system.

It has recently been discovered that 1-olefins having a maximum monomer chain length of 8 carbon atoms and no branching nearer the double bond than the 4-position can be polymerized to solid and semi-solid polymers at low temperatures and pressures as compared with conventional processes for polymerizing these olefins. Such polymerization is generally carried out by first admixing and at least partially dissolving the olefin in a non-polymerizable solvent and carrying out the polymerization in the presence of a catalyst.

In the copending application of Hogan et al. filed December 20, 1954, and having Serial No. 476,306, a process is disclosed for producing novel polymers of 1-olefins by carrying out the polymerization at a temperature in the range of 150 to 450° F. in the presence of 0.1 to 10 or more weight percent of chromium oxide, including a substantial proportion of hexavalent chromium, associated with at least one porous oxide selected from the group consisting of silica, alumina, zirconia and thoria. This catalyst is a highly oxidized catalyst which has been activated by high-temperature treatment with an oxidizing gas. Olefins other than the 1-olefins as described are polymerized by the action of this catalyst but such polymers are preponderantly normally liquid. The polymerization is preferably in the liquid phase such as in solution in a hydrocarbon solvent, especially a paraffin or naphthene which is liquid under the polymerization conditions, but vapor phase operation or mixed phase operation is effective. Diolefins can also be polymerized by the chromium oxide catalyst to solid polymers. The diolefins must have at least 1 terminal double bond and small substituents, e. g. $CH_3$, Cl, $C_2H_5$ can be as close as the 3-position to the terminal double bond. The polymer products as preferred are viscous making it difficult to remove the polymerization catalyst. For this reason, the polymer products are frequently put into a hydrocarbon solvent, preferably paraffins and/or cycloparaffins to lower the viscosity and thereby facilitate catalyst removal by filtration.

The copending application of Hogan et al. filed July 22, 1954, having Serial No. 445,042, discloses a method of decreasing the viscosity of the polymer solution to facilitate the removal of catalyst.

In all of the above processes, the separation of polymer from catalyst presents a problem. To obtain efficient separation, i. e. separation within a reasonable time and without excessive plugging of the filter medium, a filter aid is often desirable. The catalyst is regenerated and unless the filter aid is combustible or otherwise consumed at the regeneration temperature, it remains with the catalyst and is recirculated therewith. However, these filter aids are generally inefficient after passing through the catalyst regeneration and the polymerization zones and new filter aid must be added. This, of course, means a continual build up of used filter aid concentration.

The catalyst used in these disclosed polymerization processes in a moving bed continuous process can have a particle size from a fine powder to fairly large lumps but it generally does not exceed about 14 mesh. However, the finer material is more difficult to separate and for that reason catalyst having a particle size in the range of 60 mesh to 18 mesh is preferred. This coarse catalyst particle size continuously decreases during the polymerization. Such fine catalyst is more difficult to remove, therefore, it is desirable to continuously remove these fines and replace with fresh catalyst.

It is an object of this invention to provide a method and apparatus of separating and recovering catalyst in a continuous olefinic polymerization system.

Another object of this invention is to provide a method and apparatus for removing filter aid and catalyst fines from an olefinic polymerization system.

Other objects and advantages and features will be apparent to those skilled in the art upon reading this disclosure.

By the process of this invention, a filter aid is added to the polymer-catalyst slurry in a diluent, the catalyst and filter aid separated from polymer and diluent by filtration, the catalyst regenerated, and catalyst fines and filter aid separated from catalyst of the desired particle size, such as by cyclone or an air separator.

One suitable catalyst comprises chromium oxide carried on a silica support and the filter aid frequently used is a diatomaceous earth (primarily silica). The specific gravity of the catalyst is approximately 2.4 and that of the diatomaceous filter aid is approximately 2.2. The filter aid has an average size of about 40±10 microns but will range down to 1 to 2 microns and up to 80 to 90 microns with a large percentage of the material being near the average size. Much of the catalyst will also be within this range. However, the separation can still be made by use of an air separator since the catalyst will have a physical form much like small pebbles, i. e., the dimensions are substantially equal in all directions while the filter aid has a shape approximately a disk. Separation in an air separator such as a cyclone separator is dependent upon many factors such as specific gravity, apparent density, particle size and particle shape. The flat disk like filter aid particles are more easily carried by the air than are the pebble like catalyst particles.

I will further describe this invention by referring to the attached drawing which shows an embodiment of the invention wherein ethylene is polymerized in a diluent and in the presence of a catalyst, the catalyst is filtered from the polymerization reactor effluent with the help of a filter aid, the filter cake dried, the catalyst regenerated and the catalyst fines and filter aid removed and discarded.

Referring now to the figure, ethylene is admitted to agitated reactor 1 via conduit 2 and cyclohexane-chromium oxide or alumina catalyst slurry is admitted via conduit 3. The reactor pressure is maintained at about 450 pounds per square inch gauge and the temperature at about 285° F. The reactor effluent comprising unreacted ethylene, solvent (cyclohexane), catalyst and polymer passes from reactor 1 via conduit 4 to heater 5 wherein the temperature is raised to about 325° F. The effluent then passes to flash chamber 6 via conduit 7. As the material enters chamber 6 the pressure is suddenly dropped to 100 p. s. i. g. and most of the unreacted ethylene is flashed off via conduit 8 and is returned to the reactor along with fresh ethylene via conduit 2. It is within the scope of the invention to pass this flashed ethylene to a purification zone (not shown) for purification before returning it to the reactor if desired. The polymer concentration in the reactor is about 3.5 percent and the catalyst concentration is about 0.2 weight percent. The polymer, solvent and catalyst, at about 300° F., passes via conduit 9 to rotary filter 10. Filter aid, such as diatomaceous earth, is added to the slurry in conduit 9 via conduit 11 at the rate of 2 pounds filter aid per pound of catalyst. The filter cake is washed with solvent by means of nozzles 37. The polymer in solvent is removed from filtering zone 10 via conduit 12 and the wet filter cake passes via conduit 13 to drying zone 14. The polymer in solvent is sent to a separation zone, not shown, wherein the polymer is recovered and the solvent returned to the solvent purification zone. The pressure in the dryer is reduced to about atmospheric and the temperature is maintained at about 300° F. The solvent is removed from the dryer via conduit 15 to condenser 16 and the liquid solvent passes via conduit 17 to surge tank 18. Noncondensibles are vented from this surge tank via conduit 19. The solvent then passes via conduit 20 to pump 21 wherein it is returned to solvent purification zone 33 via conduit 22. The recycle solvent is treated to remove color bodies and any moisture which might be present and other catalyst poisons. Fresh solvent from conduit 34 passes to solvent purification zone 33 wherein it is treated to remove sulfur and is also dehydrated. The two solvent sources are mixed and passed via conduit 35 and pump 36 to conduit 3 wherein catalyst is added and the slurry passed to the reactor.

The dried catalyst and filter aid cake is removed from dryer 14 via conduit 23 and is mixed in conduit 25 with hot regeneration gas from conduit 24 containing about 1 percent oxygen. The dried material is suspended in the regeneration gas and is conveyed by said gases to catalyst regenerator 26. The oxygen begins to burn dried polymer from the catalyst in conduit 25 and the suspension is passed into the catalyst regenerator 26 wherein any dried polymer is completely consumed. This catalyst regenerator is of the fluid bed type. The temperature in the catalyst regeneration zone is maintained at a temperature in the range of 900 to 1000° F. The catalyst at this point has a particle size ranging from 1 to 125 microns. A portion of the regenerated catalyst along with spent filter aid, passes via conduit 27 to cyclone separator 28 wherein the light filter aid along with the finer catalyst say less than 325 mesh (44 microns) is carried out by the spent regeneration gas via conduit 29. It will be understood by those skilled in the art that the separation will not always be sharp and some coarser material will pass overhead and some finer material will remain behind. However, the lighter diatomaceous earth will be substantially all removed (over 95%) and 10 to 60 percent of the catalyst will be removed depending upon the particle sizes. In general over 95 percent of the catalyst under the 325 mesh size is removed. The coarser regenerated catalyst is withdrawn from separator 28 via conduit 30 and is returned to the regenerator 26. The bulk of the regenerated catalyst is withdrawn via conduit 31 and is returned to conduit 3 and the reactor 1. Make up catalyst having a mesh size in the range of 18 to 60 is added to the recirculating catalyst in conduit 31 via conduit 32.

This invention has been described in one of its aspects. Those skilled in the art will see many modifications which can be made without departing from the scope of the invention.

In the above description, the polymerization of ethylene is described. However, the invention is applicable to such other olefins as 1-olefins having a maximum chain length of 8 carbon atoms and no branching nearer the double bond than the 4 position as described as well as diolefins having a terminal double bond with no branching nearer the 3 position from said double bond. Mixture of these olefins, diolefins, or olefins and diolefins can also be used. For example, an ethylene-propylene copolymer is frequently preferred as is disclosed by Hogan et al., supra.

I have illustrated this invention using the preferred catalyst, but it should be understood that this invention is applicable to the other catalysts as have been disclosed as being useful in the polymerization. Similarly, solvents as have been disclosed, are applicable as is the cyclohexane used in the description.

The polymerization reaction can be carried out at a temperature in the range of 100–450° F. with a preferred temperature for ethylene in the range of 275–375° F. and for propylene and higher molecular weight 1-olefins a temperature in the range of 150–250° F. is preferred. The pressure used is generally sufficient to maintain the solvent in the liquid phase and a pressure in the range of 100–700 p. s. i. g. is generally used with a pressure in the range of 450–550 p. s. i. g. being most frequently used.

The process described is in an agitated reactor, however, a moving bed reactor can be used. In this latter case, the catalyst as removed will contain some solvent and polymer which can be separated by filtration, and the polymer phase will contain some catalyst which is removed by filtration. In both instances a filter aid can be used. The two filter cakes are combined and dried and the catalyst regenerated and separated as described.

The rotary filter has the advantage of having the cake continuously removed, however, other filtering devices can be used. In any case the cake is treated as described. The catalyst can be reactivated at a temperature in the range of 700 to 1100° F. or higher. The chromium content of the catalyst can vary from 0.1 to 10 weight percent but a weight percent in the range of 1 to 3 is most generally used.

There are many known filter aids some of which are organic and will be oxidized in the catalyst regeneration zone. In this case the combustion product is removed along with the catalyst fines and spent regeneration gases. If the filter aid is heavier than the catalyst, two or more separators can be used in series say one removing catalyst fines and the second separating filter aid and catalyst. The filter aid required will generally be in the range of 0.5 to 6 weight part filter aid to one part catalyst and more generally in the range of 1 to 4 parts per part. The catalyst cake can be broken up by a pulverizer before being mixed with the regeneration gases if so desired. However, in a rotary drier, sufficient break down of the cake is generally obtained.

Those skilled in the art will see many more modifications which can be made. My invention is in the drying of the filter cake, regenerating the catalyst, separating reusable catalyst from catalyst fines and filter aid, and returning said reusable and regenerated catalyst to the reactor. For example, in some cases it may be preferred to operate the catalyst regeneration zone in two sections, the second section will be a soaking zone (a vessel in line 31) wherein the catalyst will be allowed to soak or stand at 950–1000° F. in a dry atmosphere. This is necessary if excessive moisture is present in the effluent from the first section.

I claim:

1. In a process wherein olefins are polymerized in the presence of a particulate solid catalyst in a solvent slurry the improvement comprising adding a filter aid to the slurry after polymerization, filtering a resulting slurry, recovering a resulting filter cake, regenerating catalyst contained in said filter cake, separating catalyst fines and sufficient filter aid to prevent continual buildup of used filter aid in the catalyst from reusable catalyst and returning regenerated and reusable catalyst to the polymerization zone.

2. In a process wherein 1-olefins are polymerized in the presence of a particulate solid catalyst in a solvent slurry the improvement comprising adding a filter aid to the slurry after polymerization, filtering a resulting slurry, recovering a resulting filter cake, regenerating catalyst contained in said filter cake, and separating sufficient filter aid to prevent continual buildup of used filter aid in the catalyst.

3. In a process wherein 1-olefins having a maximum chain length of 8 carbon atoms and having no branching closer than the 4 position from the double bond are polymerized in a solvent and in the presence of a particulate solid catalyst, the improvement comprising adding filter aid to the polymer-solvent-catalyst slurry, filtering resulting slurry, recovering a resulting filter cake, drying the filter cake and causing it to disintegrate, suspending the dried particles in a regeneration gas, passing the particles to a catalyst regeneration zone, separating fines and sufficient filter aid to prevent continual buildup of used filter aid in the catalyst from reusable catalyst and returning the reusable catalyst to a polymerization zone.

4. In a process for polymerizing 1-olefins having a chain length not greater than 8 carbon atoms and having no branching closer than the 4 position from the double bond wherein the 1-olefin is polymerized in a solvent and in the presence of a particulate solid catalyst the improvement comprising adding 0.5 to 6 weight parts filter aid per part catalyst to the polymer-solvent-catalyst slurry, filtering catalyst and filter aid from polymer in solvent, washing the resulting filter cake with additional solvent, drying the washed filter cake, disintegrating the dried filter cake, suspending the resulting particles in an oxygen containing gas at a temperature in the range of 700 to 1100° F., passing the suspension to a regeneration zone wherein the catalyst is regenerated, separating catalyst having a particle size of less than 44 microns and sufficient filter aid to prevent continual buildup of used filter aid in the catalyst from the larger catalyst particles, and returning the larger catalyst particles to the polymerization zone.

5. A process for polymerizing 1-olefins having a maximum chain length of 8 carbon atoms and having no branching closer than the 4 position to the double bond, said process comprising dissolving said olefins in a saturated hydrocarbon solvent, adding an activated chromium oxide on silica catalyst to said solution, stirring the resulting solution under a pressure in the range of 100 to 700 pounds per square inch gauge and at a temperature in the range of 100 to 450° F. until the desired degree of conversion is obtained, flashing unreacted olefin from the resulting slurry, adding filter aid at the rate of 0.5 to 6 weight parts filter aid per part catalyst to the remaining slurry, removing catalyst and filter aid from polymer solution, washing the catalyst and filter aid substantially free of polymer with additional solvent, drying the washed catalyst and filter aid, suspending the dried material in an oxygen containing gas at a temperature in the range of 700–1100° F., passing the suspension to a catalyst regeneration zone, removing at least 95 percent of the spent filter aid and at least 95 percent of the catalyst having a particle size less than 44 microns, adding fresh catalyst having a particle size in the range of 18 to 60 mesh to the remaining catalyst, and adding the resulting mixture to fresh olefin solution.

6. The process of claim 5 wherein the 1-olefin is ethylene.

7. The process of claim 5 wherein the 1-olefin is a mixture of ethylene and propylene.

8. A process of polymerizing 1-olefins having a maximum chain length of 8 carbon atoms and having no branching closer than the 4 position to the double bond, said process comprising dissolving said olefins in a paraffinic solvent, adding a chromium oxide on silica support catalyst to said solution, said catalyst having a chromium content in the range of 0.1 to 10 weight percent, agitating the resulting slurry while at a temperature in the range of 150 to 375° F. and at a pressure sufficiently high to keep said solvent in the liquid phase for a period to obtain the desired degree of conversion, flashing unpolymerized olefin from the resulting polymer slurry, adding a diatomaceous earth filter aid to the remaining polymer slurry at a rate of 0.5 to 6 weight parts filter aid per part catalyst, separating catalyst and filter aid from polymer solution, washing the separated solids with additional solvent, drying the washed solids, fluidizing the dried solids in a regeneration gas comprising a small amount of oxygen at a temperature in the range of 900 to 1000° F. so as to regenerate catalyst, separating at least 95 weight percent of said filter aid and at least 95 weight percent of catalyst having a particle size less than 44 microns. adding fresh catalyst having a particle size in the range of 18 to 60 mesh to the remaining catalyst and adding the resulting mixture to fresh olefin solution.

9. The process of claim 8 wherein the 1-olefin is ethylene, the chromium content of the catalyst is in the range of 1 to 3 weight percent, the temperature of agitation of the ethylene-catalyst slurry is in the range of 275–375° F. and the pressure in the range of 450–550 pounds per square inch gauge, the filter aid is added at a rate in the range of 1 to 4 parts filter aid per part catalyst, and wherein the separated catalyst fines comprise 10 to 60 percent of the total catalyst material.

10. In a process wherein olefins are polymerized in a solvent in the presence of a particulate solid catalyst the improvement comprising adding a filter aid to the slurry after polymerization, filtering the resulting slurry, recovering the resulting filter cake, drying the recovered filter cake, passing the dried cake to a catalyst regeneration zone, separating catalyst fines and sufficient filter aid to prevent continual buildup of used filter aid in the catalyst from reusable catalyst and recovering the regenerated and reusable catalyst.

References Cited in the file of this patent

UNITED STATES PATENTS

| | | |
|---|---|---|
| 2,447,149 | Wier | Aug. 17, 1948 |
| 2,671,117 | Kluge et al. | Mar. 2, 1954 |
| 2,692,261 | Peters et al. | Oct. 19, 1954 |